United States Patent [19]

Otsuka

[11] 4,311,742
[45] Jan. 19, 1982

[54] RETORT-STERILIZABLE LAMINATED POUCH COMPRISING A FLEXIBLE GAS-BARRIER SUBSTRATE AND BLENDED CRYSTALLINE OLEFIN LAYER

[75] Inventor: Yoshiaki Otsuka, Tokyo, Japan

[73] Assignee: Toyo Seikan Kaisha, Ltd., Tokyo, Japan

[21] Appl. No.: 179,987

[22] Filed: Aug. 21, 1980

[30] Foreign Application Priority Data

Aug. 17, 1979 [JP] Japan .................................. 54-104046
Aug. 20, 1979 [JP] Japan .................................. 54-105080

[51] Int. Cl.$^3$ .......................... B65D 35/08; B32B 3/02
[52] U.S. Cl. ...................................... 428/35; 428/192; 428/461; 428/462; 428/412; 428/481; 428/483; 428/517; 428/518; 428/520
[58] Field of Search ................. 428/35, 192, 517, 518, 428/461, 462, 520, 516

[56] References Cited

U.S. PATENT DOCUMENTS

| | | | |
|---|---|---|---|
| 3,816,230 | 6/1974 | Carreras et al. | 428/35 X |
| 3,857,754 | 12/1974 | Hirata et al. | 428/35 |
| 4,082,854 | 4/1978 | Yamada et al. | 428/35 X |
| 4,085,244 | 4/1978 | Stillman | 428/35 X |

FOREIGN PATENT DOCUMENTS 54-23032 8/1979 Japan .................................. 428/462

*Primary Examiner*—P. Ives

*Attorney, Agent, or Firm*—Sherman & Shalloway

[57] ABSTRACT

Disclosed is a retort-sterilizable laminated pouch having an excellent loading pressure resistance, which comprises two laminated sheets, each comprising a flexible gas-barrier substrate and a heat-sealable crystalline olefin resin layer formed on one surface of said substrate, said laminated sheets being piled in the form of a pouch where the olefin resin layers confront each other and the periphery of the pouch of the piled sheets being heat-sealed, wherein the crystalline olefin resin layer is composed of polyethylene having a flow ratio (Kp), defined by the following formula, of at least 165:

$$Kp = 100 \log \frac{MI_{20}}{MI_2}$$

wherein $MI_2$ stands for the melt index (g/10 min) as determined according to the condition E of ASTM D-1238 and $MI_{20}$ stands for the melt index (g/10 min) as determined according to the condition E of ASTM D-1238 except that the load is changed to 20.0 Kg and the sample collecting time is changed to 30 seconds, and a density of at least 0.935 g/cc.

It is preferred that the crystalline olefin resin layer be composed of a blend comprising a major amount of polyethylene having a flow ratio (Kp) of at least 165 and a minor amount of polyethylene having a flow ratio (Kp) not higher than 154.

6 Claims, 2 Drawing Figures

RETORT-STERILIZABLE LAMINATED POUCH COMPRISING A FLEXIBLE GAS-BARRIER SUBSTRATE AND BLENDED CRYSTALLINE OLEFIN LAYER

BACKGROUND OF THE INVENTION (1) Field of the Invention:

The present invention relates to a retort-sterilizable laminated pouch. More particularly, the present invention relates to a retort-sterilizable laminated pouch which has an excellent resistance to loading pressure.

(2) Description of the Prior Art:

For the manufacture of retort-sterilizable sealing pouches, there have been used laminated sheets comprising a flexible gas-barrier substrate such as an aluminum foil and a heat-sealable crystalline olefin resin layer formed on one surface of the substrate. Such laminated sheets are piled in the form of a pouch where the olefin resin layers confront each other, the periphery is heat-sealed to form a pouch having an opening on one side, a food or the like content is packed into the pouch from said opening, the opening is sealed after degasification and the packed pouch is sterilized under heating in a sterilizing device called "retort", whereby a package that can be stored at normal temperatures is obtained.

The crystalline olefin resin layer of this laminated sheet is required to act as a heat sealant and also as a material protecting the inner face. Furthermore, since the pouch is subjected to the heat-sterilizing treatment conducted under severe conditions, the crystalline olefin resin layer should satisfy various other requirements.

Low density polyethylene which is used most popularly as the crystalline olefin resin layer is advantageous in that the heat-sealing property is excellent, but it is defective in that both the heat resistance and the resistance to extraction are poor. More specifically, low density polyethylene is defective in that at the heat-sterilizing step conducted at high temperatures, pouch breakage is readily caused and the inner face-protecting property is degraded or the resin component migrates into the packed content to degrade the flavor of the content or the sanitary characteristics. On the other hand, medium density or high density polyethylene is excellent in the heat resistance and the resistance to extraction, but it is defective in that environmental stress cracking is readily caused. This defect leads to a fatal disadvantage that when packed and sealed pouches which have been subjected to sterilization are stored in the state where they are piled up, the heat-sealed portions become brittle and pouches are readily broken under a slight shock.

SUMMARY OF THE INVENTION

It has been found that the loading pressure strength of a heat-sterilized sealed pouch is closely related to the molecular weight distribution of polyethylene used as the inner face material and the heat sealant and when medium density or high density polyethylene having a flow ratio (Kp), described hereinafter, within a specific range, that is, at least 165, is selected and used, the loading pressure strength can remarkably be improved as compared with that of conventional laminated pouches.

It also was found that when medium density or high density polyethylene having a flow ratio (Kp) not higher than 164 is incorporated at a specific ratio into the above-mentioned medium density or high density polyethylene, the interlaminar adhesion strength can remarkably be improved without reduction of the loading pressure strength.

It is therefore a primary object of the present invention to provide a retort-sterilizable laminated material in which the above-mentioned defects observed when medium density or high density polyethylene is used as the inner face material and heat sealant can be eliminated effectively.

Another object of the present invention is to provide a retort-sterilizable laminated pouch having on the inner face thereof a crystalline olefin resin layer excellent in the heat resistance, extraction resistance, heat sealability, loading pressure resistance and interlaminar peel strength.

In accordance with the present invention, there is provided a retort-sterilizable laminated pouch having an excellent loading pressure resistance, which comprises two laminated sheets, each comprising a flexible gas-barrier substrate and a heat-sealable crystalline olefin resin layer formed on one surface of said substrate, said laminated sheets being piled in the form of a pouch where the olefin resin layers confront each other and the periphery of the pouch of the piled sheets being heat-sealed, wherein the crystalline olefin resin layer is composed of polyethylene having a flow ratio (Kp), defined by the following formula, of at least 165:

$$Kp = 100 \log \frac{MI_{20}}{MI_2} \quad (1)$$

wherein $MI_2$ stands for the melt index (g/10 min) as determined according to the condition E of ASTM D-1238 and $MI_{20}$ stands for the melt index (g/10 min) as determined according to the condition E of ASTM D-1238 except that the load is changed to 20.0 Kg and the sample collecting time is changed to 30 seconds, and a density of at least 0.935 g/cc.

In accordance with one preferred embodiment of the present invention, there is provided a retort-sterilizable laminated pouch having an excellent loading pressure resistance, wherein said crystalline olefin resin layer is composed of a blend comprising (A) polyethylene having a flow ratio (Kp) of at least 165 and a density of at least 0.935 g/cc and (B) polyethylene having a flow ratio (Kp) not higher than 164 and a density of at least 0.935 g/cc at a mixing weight ratio (A)/(B) of from 90/10 to 50/50.

The present invention will now be described in detail.

DETAILED DESCRIPTION OF THE PREFERRED EMBODIMENTS

Figure 1:
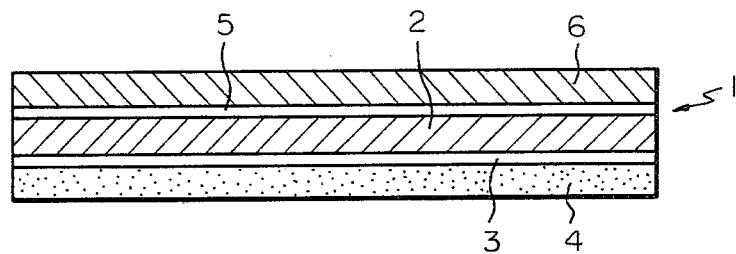
FIG. 1 is a sectional view of a laminated sheet.

Referring to FIG. 1 which illustrates the sectional structure of an example of the laminated sheet that is used in the present invention, the laminated sheet 1 comprises an aluminum foil 2, a crystalline olefin resin layer 4 bonded to one surface of the aluminum foil 2 through an adhesive layer 3 and a heat-resistant resin layer 6 bonded to the other surface of the aluminum foil 2 through an adhesive layer 5.

A shock-absorbing layer may be disposed between the aluminum foil 2 and the heat-resistant resin layer 6 through an adhesive layer according to need. Furthermore, a shock-absorbing layer may be formed between the modified olefin resin layer 3 and the crystalline olefin resin layer 4. In this case, an adhesive layer should be disposed between the shock-absorbing layer and the crystalline olefin resin layer.

Figure 2:
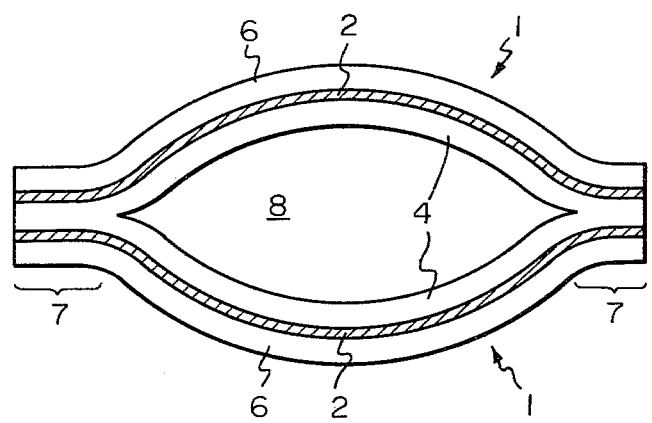
FIG. 2 is a sectional view of a sealing package.
In the drawings, reference numerals 1, 2, 3, 4, 5, 6, 7 and 8 represent a laminated sheet, an aluminum foil or sheet, an adhesive layer, a crystalline olefin resin layer, an adhesive layer, a heat-resistant resin layer, a periphery and a content-packing portion, respectively.

In preparing a sealing package, as shown in FIG. 2, two laminated sheets 1 are piled so that the crystalline olefin resin layers 4 are located inside and confront each other and the periphery 7 of the piled assembly is heat-sealed to form a pouch having a food-packing portion 8 in the interior thereof. In FIG. 2, the adhesive layers 3 and 5 are omitted for simplification.

It is one of the important features of the present invention that a film of polyethylene having a flow ratio (Kp) of at least 165 and a density of at least 0.935 g/cc, which has not been used for the manufacture of a film, should be selected and used as the crystalline olefin resin layer 4.

Polyethylene which has heretofore been used for the manufacture of a film of medium density or high density polyethylene has a flow ratio (Kp), defined by the above formula (1), lower than 160. As is seen from Comparative Example 1 given hereinafter, such conventional polyethylene film has a high heat seal strength, but when a liquid content is packed in a laminated pouch prepared from this film and the packed pouch is sealed, sterilized and stored under a load, the loading pressure strength is extremely low and the laminated pouch is readily broken under a slight shock during the storage or at the time of handling.

In contrast, when a film of polyethylene having a flow ratio (Kp) of at least 165 and a density of at least 0.935 g/cc is used as an inner face material and heat sealant of a laminated pouch according to the present invention, the loading pressure strength can be increased by one order or more over that of the conventional laminated pouch, when compared under the same conditions. This prominent functional effect of the present invention cannot be expected from the conventional laminated pouch formed by using a film of medium density or high density polyethylene at all.

In the above formula (1), $MI_2$ of the denominator indicates the melt index in an ordinary sense, which has a correlation to the molecular weight, and $MI_{20}$ of the numerator indicates the melt index at a high shear speed and the ratio $MI_{20}/MI_2$ indicates the degree of the non-Newtonian characteristic. Accordingly, the Kp value is closely related to the molecular weight distribution of polyethylene, and the larger is this value, the broader is the molecular weight distribution range.

In the present invention, the loading pressure strength of the laminated pouch can remarkably be improved by adjusting this flow ratio (Kp) to at least 165, especially 170 to 250. Furthermore, from viewpoints of heat resistance, extraction resistance and mechanical strength of the inner face material, it is important that the density of polyethylene should be at least 0.935 g/cc, especially 0.940 to 0.960 g/cc. Moreover, from the viewpoints of film-forming property and mechanical properties, it is preferred that the melt index ($MI_2$) of polyethylene be in the range of from 0.05 to 15.

As the polyethylene that is used in the present invention, there can be mentioned a homopolymer of ethylene and a copolymer of ethylene containing a comonomer such as propylene, butene-1, pentene-1, 4-methylpentene-1 or other olefin in an amount not degrading the crystallinity of the polymer, ordinarily up to 3% by weight.

Various modifications may be made to the polyethylene that is used in the present invention, so far as the above requirements are satisfied. For example, a blend of two or more kinds of polyethylenes may be used instead of the single polyethylene.

The above-mentioned polyethylene that is used in the present invention is easily available as medium density or high density polyethylene for blow-molding. Films can easily be formed from such polyethylene by known means such as the inflation film-forming method or T-die film-forming method. From the viewpoint of heat sealability, it is preferred that the thickness of the film be 10 to 300 μm, especially 30 to 100 μm. Also from the viewpoint of the heat sealability, it is preferred that the film to be used be undrawn, though an orientation observed in a T-die film is permissible.

According to one embodiment of the present invention, a film composed of a blend comprising (A) polyethylene having a flow ratio (Kp) of at least 165 as the main component and (B) polyethylene having a flow ratio (Kp) not higher than 164 in a minor amount is used as the crystalline olefin resin film.

More specifically, as pointed out hereinbefore, if polyethylene having a flow ratio (Kp) of at least 165 and a density of at least 0.935 g/cc is used as the inner face material and heat sealant of a laminated pouch, the loading pressure strength can be improved by one order or more over that of the conventional laminated pouches when compared under the same conditions. However, this laminated pouch is relatively insufficient in the adhesion strength of the inner face material to the aluminum foil substrate. If the above-mentioned blend is used according to this preferred embodiment of the present invention, the interlaminar adhesion strength can prominently be improved while maintaining the loading pressure strength at a high level.

In this preferred embodiment of the present invention, it is preferred that the flow ratio (Kp) of polyethylene (B) be 140 to 160, and from the viewpoints of the heat resistance, extraction resistance and mechanical characteristics, it is important that the density of polyethylene (B) should be within the range mentioned above with respect to the polyethylene (A). It is preferred that the melt index ($MI_2$) of polyethylene (B) be in the range of from 0.5 to 10. The polyethylene (B) that is used in the present invention is easily available as medium density or high density polyethylene for formation of films.

The blend of polyethylenes (A) and (B) may be formed by dry-blending of the two polyethylenes. Alternately, the two polyethylenes may be kneaded homogeneously by means of a roll, a kneader or an extruder.

In order to attain the intended objects of the present invention, it is important that the polyethylenes (A) and (B) should be blended at a weight ratio (A)/(B) of from 90/10 to 50/50, especially from 80/20 to 60/40.

In order to improve the shock resistance and blocking resistance of polyethylene, an elastomer such as polyisobutylene, butyl rubber, styrene-butadiene rubber or ethylene-propylene rubber or an α-olefin copolymer such as ethylene-propylene or copolymer or ethylene-butene copolymer may be incorporated into the polyethylene or polyethylene blend in an amount of 1 to 50% by weight based on the polyethylene or polyethylene blend.

An aluminum foil having a thickness of 6 to 80 μm is preferably used as the flexible gas-barrier substrate. Furthermore, there may be used a foil or other metal such as a steel foil, a cellulose film or an untreated or aceto-alkali treated polyvinyl alcohol or ethylene-vinyl alcohol copolymer film.

For the adhesive layer for bonding the substrate and crystalline olefin resin layer, there may be used not only a thermosetting adhesive such as a urethane adhesive or an epoxy adhesive, but also an acid-modified polyolefin adhesive such as maleic acid-modified polyethylene.

For the heat-resistant resin layer applied to the other surface of the gas-barrier substrate, there can be used thermoplastic resins having a higher melting or decomposition temperature than that of the above-mentioned crystalline olefin resin, and thermosetting resins.

As the heat-resistant thermoplastic resin that is used in the present invention, there can be mentioned, for example, polyesters such as polyethylene terephthalate, polyamides such as nylon-6 and nylon-6,6, polycarbonates, cellulose esters and fluorine resins. As the thermosetting resin that is used in the present invention, there can be mentioned, for example, heat-resistant polymers including in the molecule chain heterocyclic rings such as imide rings, imidazopyrrolone rings, imidazole rings, oxazole rings, oxadiazole rings or thiazole rings, such as polyimides, polyamide-imides, polyester-imides, polyamide-imide esters, polyester amide-imides and polyimide-imidazopyrrolones. Furthermore, there may be used epoxy-phenolic resin varnishes, phenolic resin varnishes, unsaturated polyester resin varnishes and oleoresinous varnishes.

The heat-resistant thermoplastic resin is easily available in the form of an undrawn or biaxially drawn film, and such film is laminated on the aluminum foil or sheet by a known adhesive such as an epoxy adhesive or a polyurethane adhesive. The thermo-infusible heat-resistant resin is formed by coating a solution of a prepolymer of such resin on an aluminum foil or sheet and baking the prepolymer.

As the shock-absorbing layer to be disposed on the outer side of the gas-barrier substrate, there can be used drawn or undrawn films of polyamides, copolyamides, polycarbonates, polyester-polyethers and polyester-polylactones, and biaxially drawn polyester films. For the shock-absorbing layer to be disposed on the inner side of the aluminum foil, there can be used polyamides or copolyamides having an adhesiveness to the modified olefin resin.

Lamination of the foregoing films may be accomplished by the dry lamination method or other known method.

The so prepared laminated sheet is used for formation of the pouch of the present invention. More specifically, two of the laminated sheets are piled so that the crystalline olefin resin layers are located on the inner side and confront each other, and the three peripheral portions of the piled assembly are heat-sealed to form a flexible pouch-shaped container vessel. Heat sealing can easily be accomplished by means of a heating bar, a heating knife, a heating wire, an impulse sealer, an ultrasonic sealer or an induction heating sealer.

A food which is corruptible, especially a liquid food, is packed in the so formed pouch. If necessary, gases injurious for storage, such as air, are removed by known means such as the vacuum degasification method, the hot packing method, the boiling degasification method, the steam jetting method or the method for effecting degasification by deformation of the vessel. Then, the packing opening is sealed according to the above-mentioned heat sealing method. The packed pouch is charged in a retorting apparatus and is sterilized under heating at a temperature higher than 100° C.

The retort-sterilizable laminated pouch according to the present invention is especially advantageous in that even if the packed pouch is subjected to retort sterilization conducted under such severe conditions, the flavor of the content is not changed and the sealed portion is not broken at all after this retort sterilization or even if shock due to falling or the like is imposed on the packed pouch.

The present invention will now be described in detail with reference to the following Examples that by no means limit the scope of the invention.

In these Examples, the loading pressure strength was determined in the following manner.

A predetermined load (17.0 Kg/pouch) was imposed on a pouch packed with a content (140 cc of water and 40 cc of a detergent) under accelerated conditions, that is, at an ambient temperature of 55° C. The time required for the content to begin to leak from the pouch was measured, and the loading pressure strength was expressed by the measured time.

EXAMPLE 1

By using a three-layer sheet comprising a polyethylene terephthalate film having a thickness of 12 μ, an aluminum foil having a thickness of 9 μ and an inner face film having a thickness of 70 μ and being composed of high density polyethylene having a flow ratio (Kp), of 180.0, a density of 0.958 g/cc and a melt index (MI) of 0.5 g/10 min, a pouch having a length of 170 mm and a width of 130 mm was prepared, and 180 g of a water-/oil suspension was packed in the pouch and the pouch was sealed. The packed pouch was treated under conditions shown in Table 1, and the adhesion strength (Kg/15 mm) between the aluminum foil and the inner face film was measured. Furthermore, the packed pouch was permitted to fall down vertically on a concrete floor from a height of 1.2 mm 10 times while maintaining the temperature of the content at 0° to 2° C., and the number of broken pouches was examined. Separately, a pouch prepared in the same manner as described above was filled with 140 cc of water and 40 cc of a detergent and was sealed. A load of 17.0 Kg/pouch was imposed on the packed pouch at an ambient temperature of 55° C., and the time required for the content to begin to leak from the pouch (the loading pressure strength) was examined. The obtained results are shown in Table 1.

TABLE 1

| | Heat Treatment Conditions | | |
|---|---|---|---|
| | not treated | 100° C., 30 minutes | 120° C., 30 minutes |
| Adhesion strength (Kg/15 mm) | 200 | 215 | 230 |
| Loading pressure strength (hours) | 42 | 42 | 46 |
| Falling strength (number of broken pouches among 50 pouches) | 10 | 9 | 4 |

COMPARATIVE EXAMPLE 1

A pouch was prepared in the same manner as described in Example 1 except that a film of polyethylene having a flow ratio (Kp) of 160.0, a density of 0.953 g/cc and a melt index (MI) of 1.2 g/10 min was used instead of the inner face film used in Example 1. Packing and sealing were carried out in the same manner as described in Example 1. The adhesion strength, loading pressure strength and falling strength were determined in the same manner as described in Example 1 to obtain results shown in Table 2.

TABLE 2

|  | Heat Treatment Conditions | | |
| --- | --- | --- | --- |
|  | not treated | 100° C., 30 minutes | 120° C., 30 minutes |
| Adhesion strength (Kg/15 mm) | 800 | 830 | 930 |
| Loading pressure strength (hours) | 5 | 7 | 7 |
| Falling strength (number of broken pouches among 50 pouches) | 24 | 20 | 18 |

EXAMPLE 2

By using a three-layer sheet comprising a polyethylene terephthalate film having a thickness of 12 μ, an aluminum foil having a thickness of 9 μ and an inner face film having a thickness of 70 μ and being composed of a blend comprising 80% of high density polyethylene having a flow ratio (Kp) of 180.0, a density of 0.958 g/cc and a melt index (MI) of 0.5 g/10 min and 20% of high density polyethylene having a flow ratio (Kp) of 160.0, a density of 0.953 g/cc and a melt index (MI) of 1.2 g/10 min, a pouch having a length of 170 mm and a width of 130 mm was prepared, and 180 g of a water/oil suspension was packed and the pouch was sealed.

The pouch was treated under conditions shown in Table 3, and the adhesion strength (Kg/15 mm) between the aluminum foil and the inner face film and the loading pressure strength were measured. Separately, the packed pouch was let to fall down vertically on a concrete floor from a height of 1.2 m 10 times while the temperature of the content was maintained at 0° to 2° C., and the number of broken pouches was examined. The obtained results are shown in Table 3.

TABLE 3

|  | Heat Treatment Conditions | | |
| --- | --- | --- | --- |
|  | not treated | 100° C., 30 minutes | 120° C., 30 minutes |
| Adhesion strength (Kg/15 mm) | 460 | 620 | 790 |
| Loading pressure strength (hours) | 36 | 36 | 39 |
| Falling strength (number of broken pouches among 50 pouches) | 13 | 10 | 6 |

COMPARATIVE EXAMPLE 2

A pouch was prepared in the same manner as described in Example 2 except that a film of high density polyethylene having a flow ratio (Kp) of 160.0, a density of 0.953 g/cc and a melt index (MI) of 1.2 g/10 min was used instead of the inner face film used in Example 2. Packing and sealing were carried out in the same manner as described in Example 2. The adhesion strength, loading pressure strength and falling strength were determined in the same manner as described in Example 2 to obtain results shown in Table 4.

TABLE 4

|  | Heat Treatment Conditions | | |
| --- | --- | --- | --- |
|  | not treated | 100° C., 30 minutes | 120° C., 30 minutes |
| Adhesion strength (Kg/15 mm) | 800 | 830 | 930 |
| Loading pressure strength (hours) | 5 | 7 | 7 |
| Falling strength (number of broken pouches among 50 pouches) | 24 | 20 | 18 |

EXAMPLE 3

Pouches were prepared in the same manner as described in Example 2 except that the mixing ratio of the two polyethylenes in the inner face film was changed as shown in Table 5. The adhesion strength between the inner face film and the aluminum foil and the loading pressure strength were determined to obtain results shown in Table 5.

TABLE 5

| Heat Treatment Conditions | A/B Mixing Weight Ratio | | | | | |
| --- | --- | --- | --- | --- | --- | --- |
|  | 100/0 | 90/10 | 80/20 | 70/30 | 60/40 | 40/60 |
| Adhesion Strength (Kg/15 mm) | | | | | | |
| not treated | 200 | 420 | 460 | 470 | 520 | 620 |
| 80° C., 30 minutes | 205 | 520 | 530 | 570 | 600 | 720 |
| 100° C., 30 minutes | 215 | 620 | 620 | 630 | 700 | 740 |
| 120° C., 30 minutes | 230 | 760 | 790 | 820 | 900 | 980 |
| Loading Pressure Strength (hours) | | | | | | |
| not treated | 42 | 40 | 36 | 36 | 34 | 6 |
| 80° C., 30 minutes | 40 | 40 | 38 | 36 | 36 | 8 |
| 100° C., 30 minutes | 42 | 42 | 36 | 38 | 36 | 8 |
| 120° C., 30 minutes | 46 | 44 | 39 | 38 | 36 | 10 |

Note
A: high density polyethylene having a flow ratio (Kp) of 180.0, a density of 0.958 g/cc and a melt index (MI) of 0.5 g/10 min
B: high density polyethylene having a flow ratio (Kp) of 160.0, a density of 0.953 g/cc and a melt index (MI) of 1.2 g/10 min

EXAMPLE 4

Pouches were prepared in the same manner as described in Example 3 except that a polyethylene blend shown in Table 6 was used for the inner face film. The adhesion strength between the inner face film and the aluminum foil and the loading pressure strength were determined to obtain results shown in Table 6.

TABLE 6

| Heat Treatment Conditions | Polyethylene Blend (mixing weight ratio) | | |
|---|---|---|---|
| | A/C = 80/20 | A/D = 80/20 | A/B = 80/20 |
| Adhesion Strength (Kg/15 mm) | | | |
| not treated | 210 | 400 | 460 |
| 120° C., 30 minutes | 260 | 680 | 790 |
| Loading Pressure Strength (hours) | | | |
| not treated | 38 | 37 | 36 |
| 120° C., 30 minutes | 41 | 39 | 39 |

Note
A: high density polyethylene having a flow ratio (Kp) of 180.0, a density of 0.958 g/cc and a melt index (MI) of 0.5 g/10 min
B: high density polyethylene having a flow ratio (Kp) of 160.0, a density of 0.953 g/cc and a melt index (MI) of 1.2 g/10 min
C: high density polyethylene having a flow ratio (Kp) of 170.0, a density of 0.954 g/cc and a melt index (MI) of 1.0 g/10 min
D: high density polyethylene having a flow ratio (Kp) of 164.0, a density of 0.950 g/cc and a melt index (MI) of 1.6 g/10 min

EXAMPLE 5

A high density polyethylene film having a thickness of 70 μ was prepared from a mixture comprising 40% by weight of high density polyethylene having a flow ratio (Kp) of 180.0, a density of 0.958 g/cc and a melt index (MI) of 0.5 g/10 min, 40% by weight of high density polyethylene having a flow ratio (Kp) of 160.0, a density of 0.953 g/cc and a melt index (MI) of 1.2 g/10 min and 20% by weight of ethylene-propylene rubber.

A biaxially drawn polyethylene terephthalate film having a thickness of 12 μ was laminated on an aluminum foil having a thickness of 9 μ, and the above-mentioned high density polyethylene film was laminated on the aluminum foil face of the above laminate. A pouch having a length of 170 mm and a width of 130 mm was prepared from the so prepared three-layer laminated sheet so that the high density polyethylene film was located on the inner face side. Then, 180 g of a water-/oil suspension was packed in the pouch and the pouch was sealed.

The packed pouch was treated under conditions shown in Table 7, and the adhesion strength (Kg/15 mm) between the aluminum foil and the inner face film was determined. Separately, the pouch was permitted to fall down vertically on a concrete floor from a height of 1.2 m 10 times while maintaining the temperature of the content at 0° to 2° C., and the number of broken pouches was examined. Furthermore, 140 cc of water and 40 cc of a detergent were packed in the pouch and a load of 17.0 Kg/pouch was imposed on the packed pouch at an ambient temperature of 55° C. The time required for the content to begin to leak from the pouch (loading pressure strength) was examined. The obtained results are shown in Table 7.

TABLE 7

| | Heat Treatment Conditions | | |
|---|---|---|---|
| | not treated | 100° C., 30 minutes | 120° C., 30 minutes |
| Adhesion strength (Kg/15 mm) | 380 | 500 | 600 |
| Loading pressure strength (hours) | 40 | 40 | 43 |
| Falling strength (number of broken pouches among 50 pouches) | 7 | 6 | 3 |

What I claim is:

1. A retort-sterilizable laminated pouch having an excellent loading pressure resistance, which comprises two laminated sheets, each comprising a flexible gas-barrier substrate and a heat-sealable crystalline olefin resin layer formed on one surface of said substrate, said laminated sheets being piled in the form of a pouch where the olefin resin layers confront each other and the periphery of the pouch of the piled sheets being heat-sealed, wherein the crystalline olefin resin layer is composed of a blend comprising (A) polyethylene having a flow ratio (Kp), defined by the following formula, of at least 165:

$$Kp = 100 \log \frac{MI_{20}}{MI_2}$$

wherein $MI_2$ stands for the melt index (g/10 min) as determined according to the condition E of ASTM D-1238 and $MI_{20}$ stands for the melt index (g/10 min) as determined according to the condition E of ASTM D-1238 except that the load is changed to 20.0 Kg and the sample collecting time is changed to 30 seconds, and a density of at least 0.935 g/cc and (B) polyethylene having a flow ratio (Kp) not higher than 164 and a density of at least 0.935 g/cc at a mixing weight ratio (A)/(B) of from 90/10 to 50/50.

2. A laminated pouch as set forth in claim 1, wherein polyethylene (A) has a melt index ($MI_2$) of 0.05 to 15 g/10 min.

3. A laminated pouch as set forth in claim 1, wherein a layer of a thermoplastic resin having a higher melting or decomposition temperature than that of the crystalline olefin resin or a thermosetting resin is formed on the other surface of said gas-barrier substrate.

4. A laminated pouch as set forth in claim 1, wherein the polyethylene having a flow ratio (Kp) of at least 165 is polyethylene having a melt index ($MI_2$) of 0.05 to 15 g/10 min and the polyethylene having a flow ratio (Kp) not higher than 164 is polyethylene having a melt index ($MI_2$) of 0.5 to 15 g/10 min.

5. A laminated pouch as set forth in claim 1, wherein the mixing weight ratio (A)/(B) of (A) the polyethylene having a flow ratio (Kp) of at least 165 to (B) the polyethylene having a flow ratio (Kp) not higher than 164 is in the range of from 80/20 to 60/40.

6. A laminated pouch as set forth in claim 1, wherein the crystalline olefin resin layer contains at least one member selected from polyisobutylene, butyl rubber, styrene-butadiene rubber, ethylene-propylene rubber and ethylene-propylene-diene rubber in an amount of 1 to 50% by weight based on the sum of the polyethylene having a flow ratio (Kp) of at least 165 and the polyethylene having a flow ratio (Kp) not higher than 164.

* * * * *